(No Model.)
A. McNIECE.
CLAMP FOR SAW HANDLES.
No. 308,037. Patented Nov. 11, 1884.
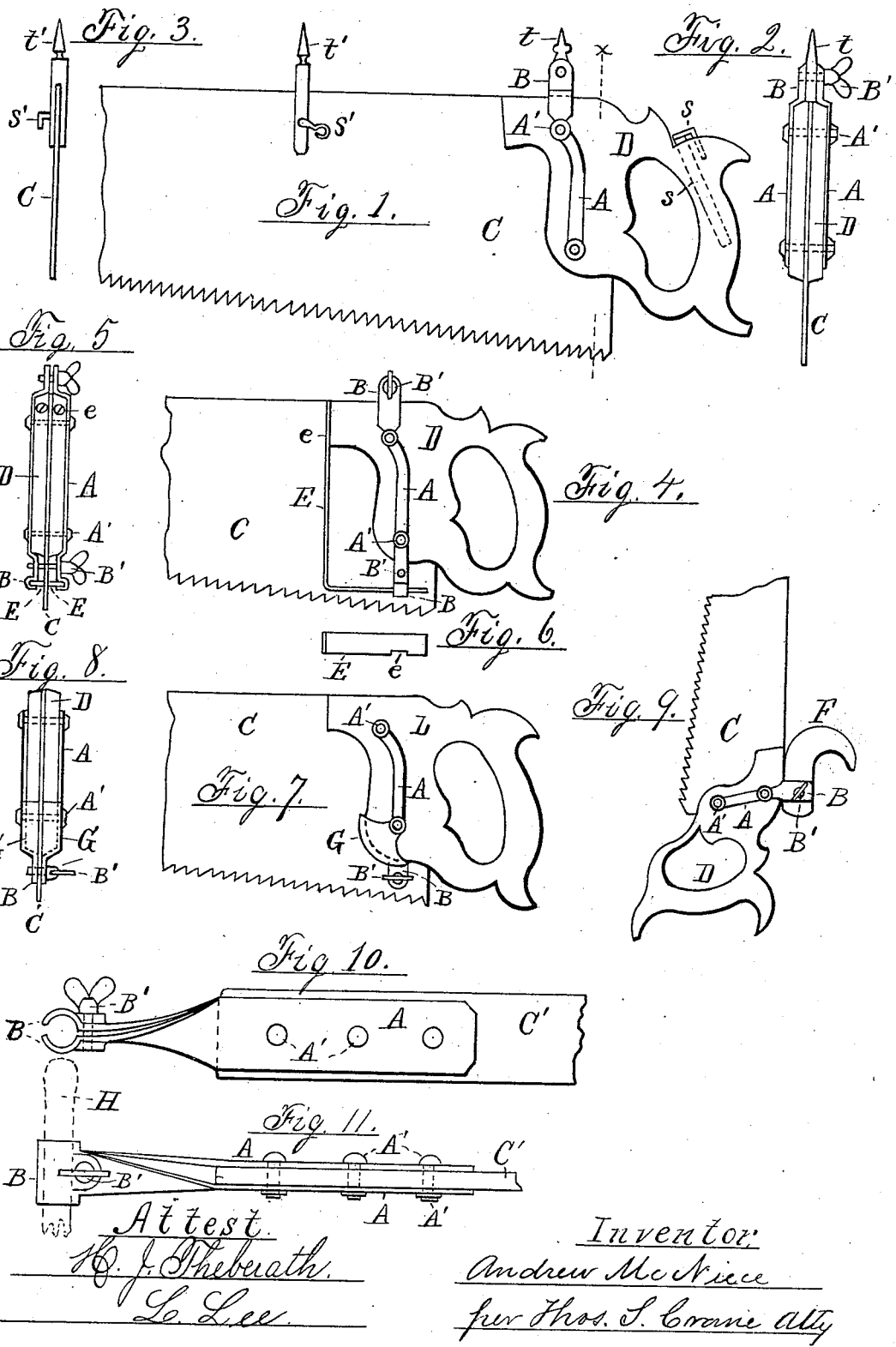

UNITED STATES PATENT OFFICE.

ANDREW McNIECE, OF NEWARK, NEW JERSEY, ASSIGNOR OF ONE-HALF TO ROWLAND HILTON, OF SAME PLACE.

CLAMP FOR SAW-HANDLES.

SPECIFICATION forming part of Letters Patent No. 308,037, dated November 11, 1884.

Application filed March 6, 1884. (No model.)

*To all whom it may concern:*

Be it known that I, ANDREW MCNIECE, a citizen of the United States, residing in Newark, Essex county, New Jersey, have invented certain new and useful Improvements in a Combined Clamp and Jaw, fully described and represented in the following specification and the accompanying drawings, forming a part of the same.

The object of this invention is to furnish a means of securing a pair of elastic jaws by rigid feet to the handle or blade of a saw or other suitable object; and my construction (referring to the letters on the annexed drawings) consists in the combination, with a saw-handle or analogous object, of the combined clamp and holding-jaw, consisting in the similar and opposed parts A B, the plates A being rigidly clamped together upon opposite sides of the handle by the screws or rivet A', the jaws B projecting beyond the handle and being constructed to spring elastically to and from one another, as described, and the screw B' passed through the jaws and operating to bind their elastic ends together, substantially as shown and described.

Several modifications of my invention are shown in the drawings, in which Figure 1 is a side view of a hand-saw having the clamp attached to strengthen the handle and to carry a trammel-point. Fig. 2 is an end view of the same handle, and Fig. 3 is an end view of the blade carrying the adjustable trammel-point. Fig. 4 is a side view of a saw having the clamp applied to hold a square stock, and Fig. 5 is an end view of such handle. Fig. 6 is a plan of the notched half of such square stock. Fig. 7 is a side view of a saw having the clamp applied to hold a guard at the base of the handle. Fig. 8 is a front end view of such handle and guard. Fig. 9 is a side view of a handle having the clamp applied to hold a pruning-hook at the back of the saw-blade; and Fig. 10 is a plan, and Fig. 11 an edge view, of the clamp applied to a saw-blade, C'.

The similar holding-pieces are each formed with a plate, A, and a jaw, B, and are provided with a screw, B', for pressing such jaws together. The plates A are fastened to any desired object, as a saw blade or handle, or the trace shown in Fig. 11 at C', by screws or rivets A', and thus serve to strengthen such object by their clamping action. The jaws B B project from such clamped object in all cases, and thus serve to secure other adjacent objects by the pressure of the screw B', the plates A being in all cases made sufficiently flexible to yield under the pressure of such screw.

In Figs. 1 to 9 the clamps A are shown applied to a saw-handle in lieu of the screws ordinarily employed to clamp the handle D upon the blade C, the clamp in such case operating much more effectively than the screws, for two reasons: first, the screw-heads usually employed have a much smaller bearing-surface than the clamping-plates A A; and, secondly, as they bear directly against the wood they cannot be screwed up so tightly as if seated upon a metallic plate. As a consequence they frequently wear loose, both in the holes in the wood and in the saw-blade, and new and larger screws must be used to prevent the blade from rattling in the handle.

The use of my clamp renders it possible to screw up the nuts at first or at any subsequent time so tightly as to quite prevent the wear referred to. When thus applied to the saw-handle the clamps A A may be made auxiliary to hold many other attachments, all of which are secured to the handle by the jaws B B and their screw B'. Such jaws may be used also to clamp the handle and blade apart from other attachments, as shown at the upper ends of the clamps in Fig. 4.

In Fig. 1 the jaws B B are represented as holding a trammel-point, t, and the handle is provided with a bored socket, s, in which a movable point, t', is shown secured by a screw, s', having a bent head to keep the point t' in the socket. The point is also shown secured on the blade of the saw at t' by using the same screw s' as a set-screw. The saw and points thus act as a beam compass or trammel.

In Figs. 4 and 5 the clamps A A are shown provided with jaws B B and screws B' at each end, the lower ones serving to hold a square stock, E, in place, the stock being screwed to the handle at e, and held by the fitting of the jaws B B into a notch, $e'$, formed in the opposite edges of the two pieces E. (Shown in Fig. 5.)

In Figs. 7 and 8 the clamps A A and jaws B B are shown holding guards G against the lower front corners of the handle D, where the handle is often splintered by blows with the stuff when sawing, and where such blows generally jar the clamping-screws loose. The guards are cast in one piece with the clamps, and the jaws serve to press them both firmly upon the handle and the blade when the screw B' is tightened. In this figure, as well as in Figs. 4, 5, and 8, the screw B' is represented as passed through the saw-blade as well as the screws A', to aid in clamping the handle and blade.

In Fig. 9 the jaws B B are shown holding a pruning-knife, F, upon the back of a saw-handle, in a most convenient position for use in connection with a pruning-saw.

The blade can readily be removed for sharpening by slacking or removing the jaw-screw B'.

Fig. 10 shows the jaws B B twisted ninety degrees, to adapt them for grasping an object at right angles to the plane of the piece clamped by the plates A A, and thus fitting them to hold a crosscut-saw handle in such position when required, the jaws being shown curved transversely for such purpose.

In Fig. 11 I have indicated a straight round bar, H, in dotted lines, to show how the curved jaws in that figure are suited for holding a crosscut-saw handle when the clamps A A are secured upon the saw-blade at the extreme ends.

The flat plate C' represents the end of a saw-blade, with the handle secured at right angles thereto, and it is obvious that such handle may be held in any desired relation to the blade by shaping and twisting the jaws B B differently.

Having thus fully described my invention, it will be seen that it is capable of various applications, in all of which, however, I use the opposite clamping-plates, A A, rigidly secured by their own fastenings A' A', and the attached and opposed jaws B B, provided with their own screw B', and operating elastically in reference so the rigid clamps A A.

I therefore claim as follows:

1. The combination, with a saw-handle or analogous object, of the combined clamp and holding jaw, consisting in the similar and opposed parts A B, the plates A being rigidly clamped together upon opposite sides of the handle by the screws or rivets A', the jaws B projecting beyond the handle and being constructed to spring elastically to and from one another, as described, and the screw B', passed through the jaws and operating to bind their elastic ends together, substantially as shown and described.

2. The combination, with the saw-handle C, of the plates A A, secured by fastenings A', and provided with jaws B B, and guards G G, secured by the screw B', as and for the purpose set forth.

In testimony whereof I have hereunto set my hand in the presence of two subscribing witnesses.

ANDREW McNIECE.

Witnesses:
CHAS. C. HERRICK,
THOS. S. CRANE.